(12) United States Patent
Kaukeinen et al.

(10) Patent No.: US 7,784,216 B2
(45) Date of Patent: Aug. 31, 2010

(54) CLIMATE-CONTROLLED PEST CONTROL STATION

(75) Inventors: Dale Kaukeinen, Wilmington, DE (US); Daniel Kidder, Greensboro, NC (US)

(73) Assignee: Sygenta Crop Protection, Inc., Greensboro, NC (US)

( * ) Notice: Subject to any disclaimer, the term of this patent is extended or adjusted under 35 U.S.C. 154(b) by 259 days.

(21) Appl. No.: 11/768,220

(22) Filed: Jun. 26, 2007

(65) Prior Publication Data
US 2008/0010895 A1    Jan. 17, 2008

Related U.S. Application Data

(63) Continuation-in-part of application No. PCT/US2005/046036, filed on Dec. 19, 2005.

(60) Provisional application No. 60/640,660, filed on Dec. 30, 2004.

(51) Int. Cl.
*A01M 1/20* (2006.01)
(52) U.S. Cl. ............................ 43/131; 43/132.1; 43/124
(58) Field of Classification Search .................. 43/131, 43/132.1, 124
See application file for complete search history.

(56) References Cited

U.S. PATENT DOCUMENTS

| 2,205,125 | A | * | 6/1940 | Rose | 43/131 |
| 2,219,403 | A | * | 10/1940 | Sennewald | 43/131 |
| 2,242,098 | A | * | 5/1941 | Wittwer et al. | 43/131 |
| 2,242,099 | A | * | 5/1941 | Wittwer et al. | 43/131 |
| 3,747,260 | A | * | 7/1973 | Lovness | 43/131 |
| 3,771,254 | A | * | 11/1973 | Scott et al. | 43/131 |
| 5,152,097 | A | | 10/1992 | Rhodes | |
| 6,145,242 | A | * | 11/2000 | Simpson | 43/131 |
| 6,192,621 | B1 | | 2/2001 | Fain | |
| 2005/0134466 | A1 | * | 6/2005 | Tirkel | 340/573.2 |

* cited by examiner

*Primary Examiner*—Christopher P Ellis
(74) *Attorney, Agent, or Firm*—William A. Teoli, Jr.

(57) ABSTRACT

A climate-controlled control station includes a protective enclosure containing a pest control material and/or control device. A reflector or heat shield protects the enclosure from impinging infrared radiant energy, thereby moderating the internal air temperature in the enclosure. At least part of the enclosure may be insulated against heat transfer. A vent in the enclosure facilitates exhausting hot and/or humid air from the enclosure. A fan or blower may be provided for forcing hot and/or humid air from the enclosure.

15 Claims, 9 Drawing Sheets

CLIMATE-CONTROLLED PEST CONTROL STATION

This application is a continuation-in-part of International Application No. PCT/US2005/046036filed Dec. 19, 2005, which claims priority to U.S. 60/640,660filed Dec. 30, 2004, the contents of which are incorporated herein by reference.

FIELD OF THE INVENTION

The invention relates to pest control devices, and more particularly relates to a climate-controlled pest control station that provides moderated maximum internal temperatures and humidity.

BACKGROUND

Professional exterminators, home and business owners, and maintenance personnel commonly place pest control equipment around the exteriors or interiors of buildings to control, monitor, or exterminate pests. For example, pest control stations may be placed around the exteriors of buildings to control rodents or other pests. Such pest control stations typically include a durable outer enclosure configured to prevent or at least discourage unauthorized persons from opening the enclosure and contacting materials inside. Such tamper-resistant enclosures often house pest control products such as toxic or non-toxic bait, adhesive trapping devices, toxic or non-toxic powders or liquids, killing devices such as snap traps, and/or live trapping devices. The enclosures are configured to permit rodents or other pests to enter the enclosure, and to access the pest control materials or devices inside.

Particularly when such pest control stations are placed outdoors, pest control products contained within the enclosures may degrade due to high internal temperatures and/or high internal humidity. For example, edible pest control bait can melt from excessive heat or can mold from excessive humidity, thereby rendering the bait less edible and less effective against targeted pests. The prior art includes pest control stations that are tamper-resistant to humans and accessible to pests, but such known stations fail to adequately address the issue of maintaining or prolonging the effectiveness of pest control materials within the stations.

For example, known pest control stations are believed to have outer surfaces with a surface reflectance of less than or equal to about 0.3. Therefore, the outer surfaces of known pest control stations are believed to absorb at least about 70 percent of all infrared solar radiation that impinges upon such surfaces, and thereby permit substantial radiant heating of such stations. The phrase "infrared radiation" as used herein refers to thermal radiation situated outside the visible spectrum at its red end (i.e. radiation having a wavelength from about 700 nanometers to about 1 millimeter). In addition, known pest control stations include enclosures with thin walls having extremely low thermal resistances or R-values. The R-value or Resistance-value of a material is a measure of the material's resistance to heat flow. Therefore, the poorly insulated enclosures of known pest control stations do little to prevent the conduction of heat into the stations.

Accordingly, there is a need for a pest control station that protects persons against undesired contact with the contents of the station, while also moderating the internal climate of the bait station to prevent or at least minimize degradation of the contents. More specifically, there is a need for a pest control station that effectively moderates maximum internal temperatures within the station. In addition, there is a need for a pest control station that effectively moderates maximum internal humidity within the bait station.

SUMMARY

The invention includes a climate controlled pest control station including an enclosure and means for moderating the maximum internal temperature within the enclosure. The invention also includes a climate controlled pest control station including an enclosure and means for moderating humidity within the enclosure.

In one embodiment, the pest control device includes an enclosure and a heat shield at least partially covering at least a portion of the enclosure. The enclosure defines an interior space capable of receiving a pest control composition or pest control device The enclosure includes at least one exterior surface. A reflector or heat shield may be provided to substantially shield the exterior surface from radiant thermal energy. The reflector is capable of reflecting more radiant energy than the exterior surface of the enclosure alone.

Another embodiment of a pest control device according to the invention includes an enclosure having a thermal insulating layer. The thermal insulating layer may be a layer of insulating foam, for example.

Another embodiment of a pest control device according to the invention includes an enclosure, and at least one vent in the enclosure. The vent is configured to permit at least some air within the enclosure to exit the enclosure.

The invention also includes a method of moderating the climate within a pest control enclosure. The method may include at least partially shielding the enclosure against radiant thermal energy. The method may also include venting air from within the enclosure.

A more thorough understanding of the invention may be had from a reading of the following detailed description together with the drawings.

DETAILED DESCRIPTION

Reference is made to the drawings, wherein like numbers denote like parts throughout the various embodiments shown.

Figure 1:
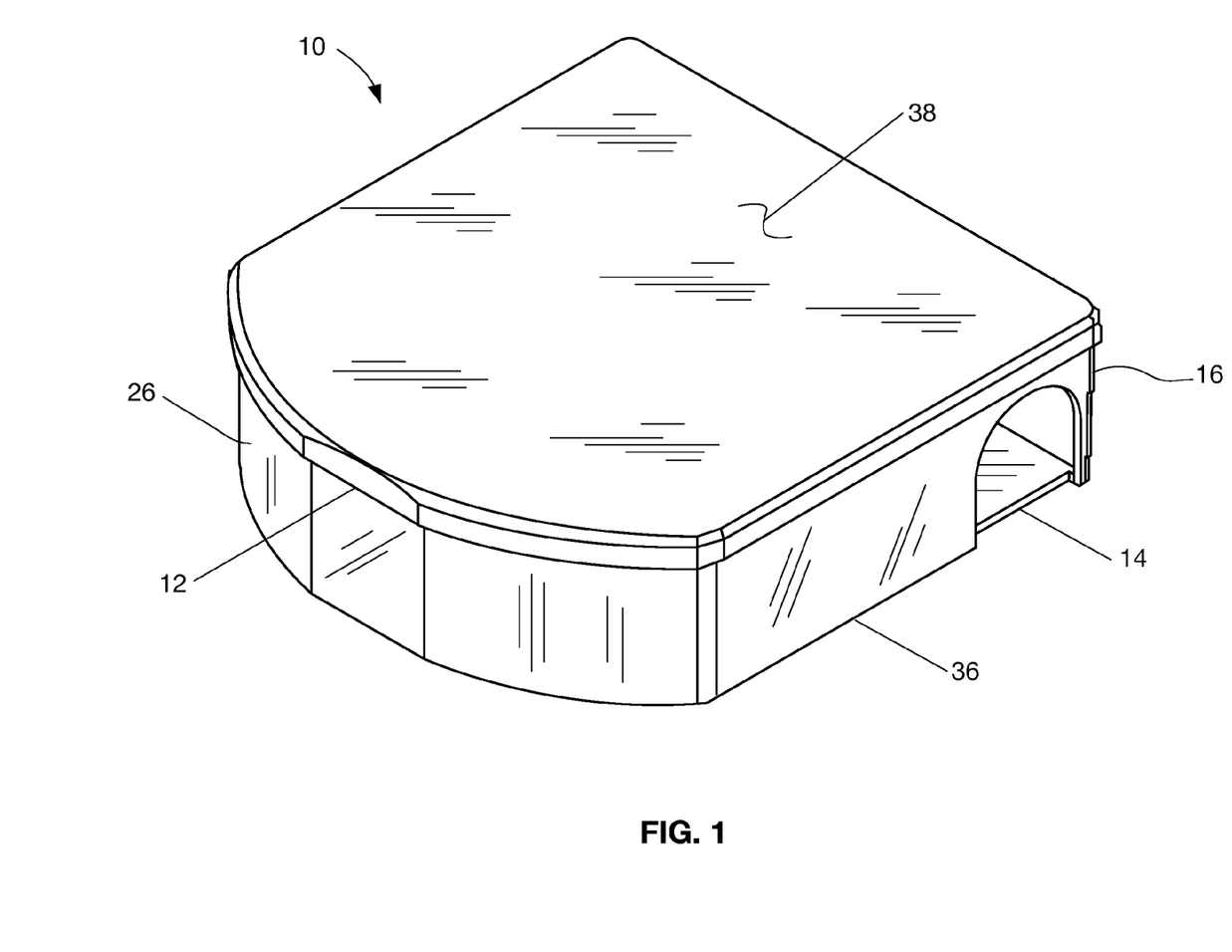
FIG. 1 is a perspective view of an embodiment of a pest control station according to the invention having an enclosure with a reflective outer surface.
Figure 2:
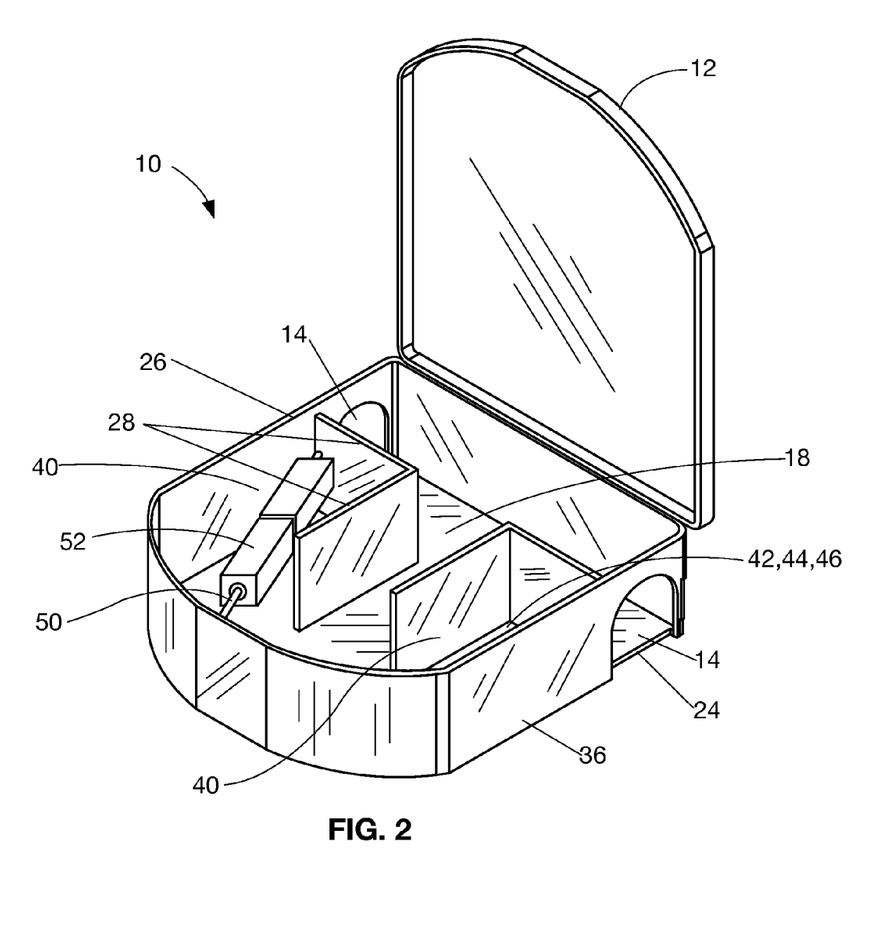
FIG. 2 is a perspective view of the pest control station of FIG. 1 shown with its top cover in an open position.

FIG. 1 shows one embodiment 10 of a pest control station according to the invention. The pest control station 10 includes an enclosure 16 formed by a base 36 and a cover 12. Preferably, the cover 12 is removably or movably attached to the base 36. As shown in FIG. 2, the cover 12 may be hingedly attached to a sidewall 26 of the base 36. The base 36 also includes a floor 24. The interior of the pest control station 16 may include one or more partition or baffle walls 28 defining one or more internal compartments 40 within the base 36. The base 36 and cover 12 preferably are constructed of a molded polymeric material such as polyethylene. In a preferred embodiment, the cover 12, base 36, and partition walls 28 have a nominal wall thickness of about 2 mm.

Pests such as rodents enter the pest control station 10 through one or more access openings 14 in the sidewalls 26 and traverse the runways 18 to access the internal compartments 40. A pest control composition 42 such as a bait material, an adhesive trapping substance, a pesticide, or the like may be placed in one or more of the compartments 40. Removable trays, place packs, or other containers 44 containing such pest control materials may be placed within the compartments 40. In addition, a securing rod 50 may be included for suspending and securing a bait block 52 within a compartment 40. A pest control device 46 such as a snap trap, a live trap, or the like also may be placed in one or more of the compartments 40.

The cover 12 may include a reflective outer surface 38 for reflecting impinging radiant energy such as sunlight in order to moderate the internal air temperature within the enclosure 16. The reflective surface 38 may be highly reflective, such as a metallic mirrored finish. Such a highly reflective surface may be achieved by attaching a metallic film or a metallized polymeric film such as metallized Mylar® to the outer surface of the cover 12. Alternatively, other types of reflective surfaces 38 may be used. For example, the surface 38 may be a smooth or glossy reflective plastic surface. The reflectivity of such a smooth or glossy surface may be enhanced by providing the cover surface 38 with a white or light color, such as light gray for example. Preferably, the reflective surface 38 is capable of reflecting more than about 70 percent of impinging infrared solar radiation. In other words, the reflective surface 38 preferably has a surface reflectance greater than about 0.3. The term "reflectance" as used herein means the fraction of the total infrared radiant flux incident upon a surface that is reflected rather than absorbed. Infrared radiation is radiation situated outside the visible spectrum at its red end, and having a wavelength between about 700 nanometers and 1 millimeter. By reflecting a substantial portion of impinging solar radiant energy, the reflective surface 38 acts as a solar radiation shield and helps to minimize the radiant heating and resultant temperature of the cover 12. Because a portion of any radiant heat energy absorbed by the cover ultimately is transferred to air within the enclosure by convection, radiation, and/or conduction, the reflective surface 38 also is effective in moderating the internal air temperature within the enclosure 16.

Figure 3A:
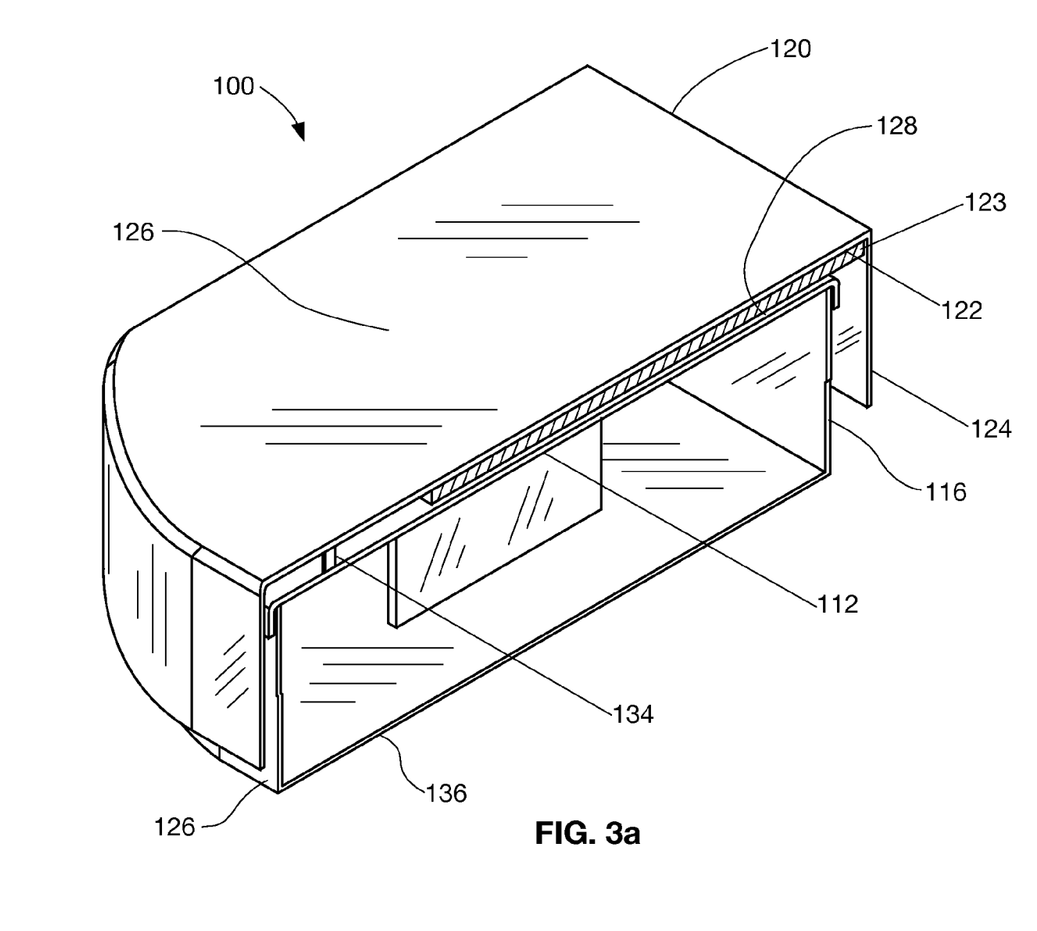
FIG. 3a is a cutaway perspective view of another embodiment of a pest control station having a separate heat shield member.
Figure 3B:
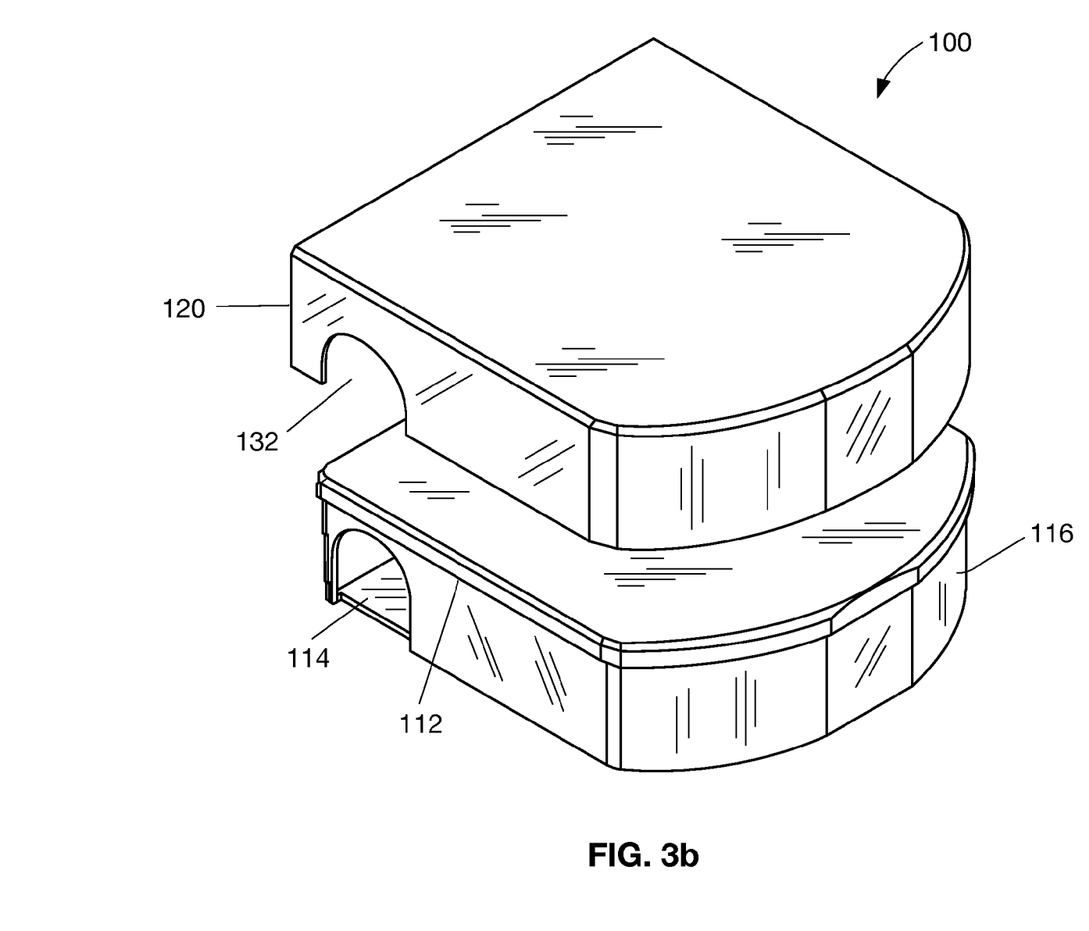
FIG. 3b is an exploded perspective view of the embodiment of FIG. 3a showing the heat shield removed from the enclosure.

In another embodiment 100 of the invention as shown in FIGS. 3a and 3b, a pest control station 100 may include an auxiliary cover or heat shield 120 that substantially covers the exposed outer surfaces of the underlying enclosure 116 comprising the primary cover 112 and base 136. As shown in FIG. 3b, the shield 120 may include a cutout 132 that substantially aligns with an access opening 114 in the base 136. As shown in FIG. 3a, the shield 120 and primary cover 112 preferably define an insulating air gap 128. A plurality of spacers or bosses 134 may be provided on the shield 120 or cover 112 to maintain a desired space or gap 128 between the cover 112 and shield 9. The insulating air gap 128 substantially impedes heat transfer between the outermost shield or cover 120 and air contained within the enclosure 116. The shield 120 may be provided with downwardly depending sidewalls 124 as shown in FIG. 3 that shield the sidewalls 126 of the enclosure 116. The shield 120 preferably is constructed of a molded polymeric material such as polyethylene, and has a nominal wall thickness of about 2 mm. Alternatively, the shield 120 may be constructed of metal (such as galvanized steel, for example), a ceramic material, or any other suitable material. The shield may also include an insulating layer 123 on an inside surface as shown in FIG. 3a. Preferably, the insulating layer 123 has an R-value of at least about 0.50 hr·ft$^{2.\circ}$ F./Btu as measured with a heat flow meter per ASTM C518 at a mean temperature of about 75° F. The term "R-value" as used herein means the reciprocal of the amount of heat energy transferred per area of material per degree difference between the outside and inside (hr·ft$^{2.\circ}$ F./Btu). In other words, "R-value" is the reciprocal of a material's thermal conductivity.

Like the cover 12 described above, the shield 120 may be provided with a reflective outer surface 126 on its top 122 such that the shield acts as a radiation shield to minimize radiant heating of the shield 120 and any subsequent indirect heat transfer to air within the underlying enclosure 116. Preferably, the reflective surface 126 is capable of reflecting at least about 70 percent of impinging infrared solar radiation. In other words, the reflective surface 126 preferably has a surface reflectance of greater than about 0.3. The reflective surface 126 may be a metallic, mirrored, glossy, and/or light-colored surface, for example.

Figure 4:
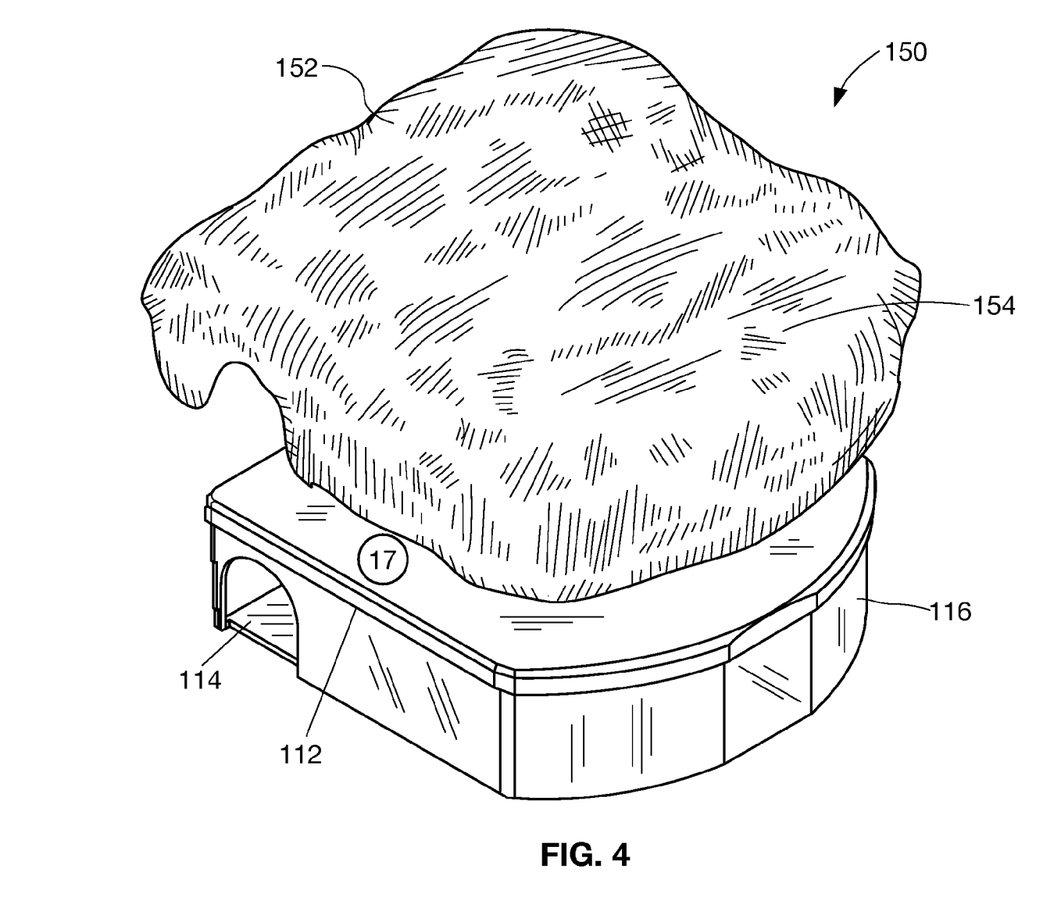
FIG. 4 is an exploded perspective view of a pest control station including a heat shield member having an ornamental or camouflaging outer shape.

As shown in FIGS. 3a and 3b, the pest control station 100 may include a shield 120 having a substantially rectilinear or curvilinear outer shape. In addition, as shown in FIG. 4, a pest control station 150 according to the invention may include a shield 152 that has an ornamental or camouflaging outer shape, such as the shape of a rock or the like. The ornamental or camouflaging outer shape of the shield 120 provides the pest control station 150 with an outer appearance that complements or blends with the station's environmental surroundings. Like the embodiment 120 described above, the ornamental or camouflaging shield 152 may include a reflective outer surface 154 having a reflectance greater than about 0.3.

Figure 5:
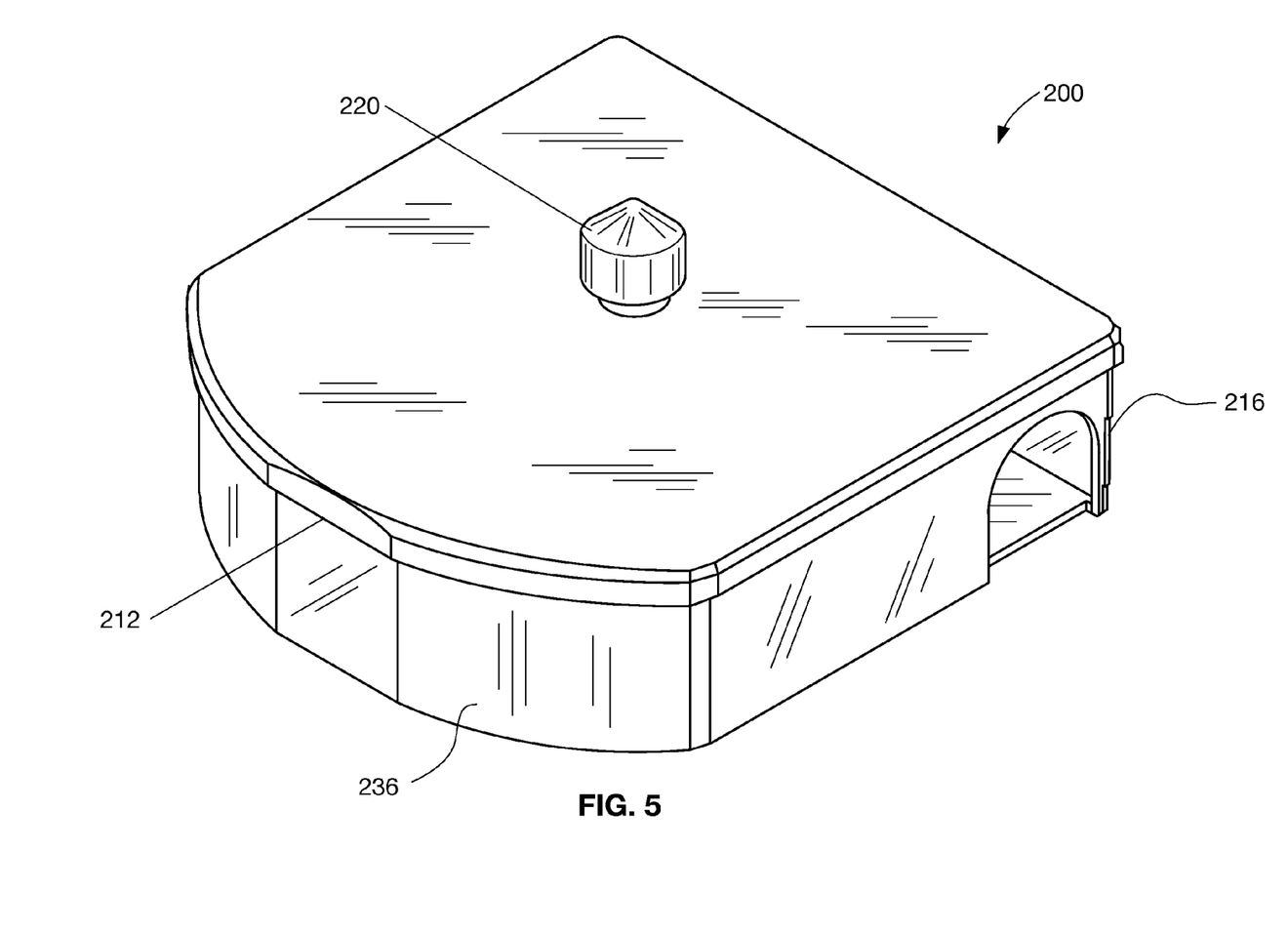
FIG. 5 is a perspective view of another embodiment of a pest control station having a leak-resistant vent.
Figure 6:
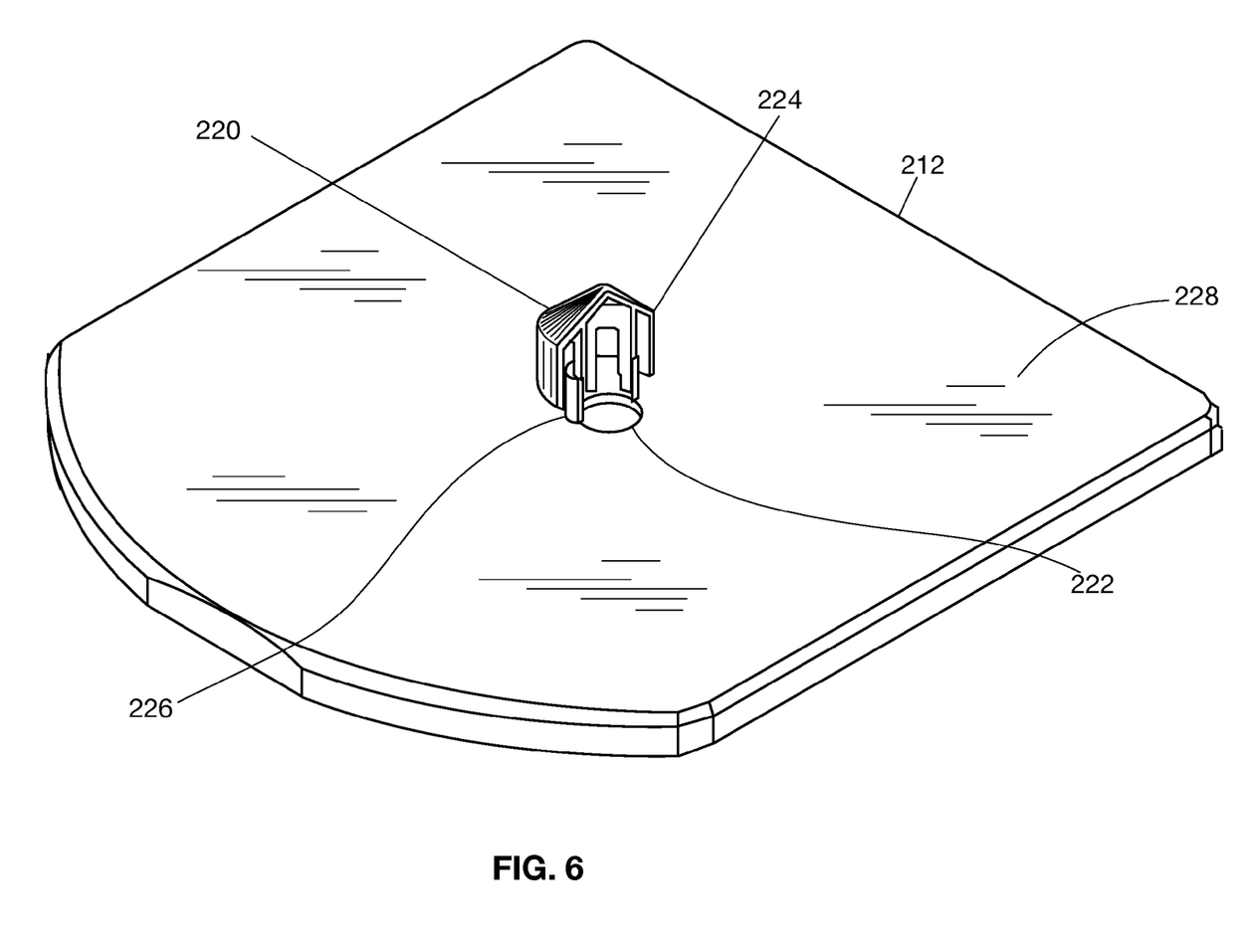
FIG. 6 is a perspective view of the top cover of the embodiment of FIG. 5 with a portion of the vent assembly broken away to show the interior of the leak-resistant vent.

FIGS. 5 and 6 show another embodiment 200 of a climate-controlled pest control station according to the invention. As shown in FIG. 5, the cover 212 may include an air vent 220. The air vent 220 preferably is configured to prevent rainwater, dust, or the like from entering the enclosure 216 through the vent 220. In the embodiment shown in FIG. 6, the vent 220 (shown in cutaway for ease of illustration) includes a chimney or pipe 226 extending above a vent opening 222 in the uppermost surface 228 of the cover 212. A shroud 220 is attached to and substantially covers the open upper end of pipe 226. The shroud 220 permits hot and humid air within the enclosure 216 to exit the vent 220, while substantially preventing rainwater, dust, or debris from falling into the open pipe 226. Preferably, the pipe 226 is integrally molded with the cover 212, and the shroud 220 is configured to snap onto or otherwise securely engage the standpipe 226. By permitting hot and humid air to pass from the enclosure 216, the vent 18 effectively moderates both the temperature and humidity of the air within the enclosure 216.

Figure 7:
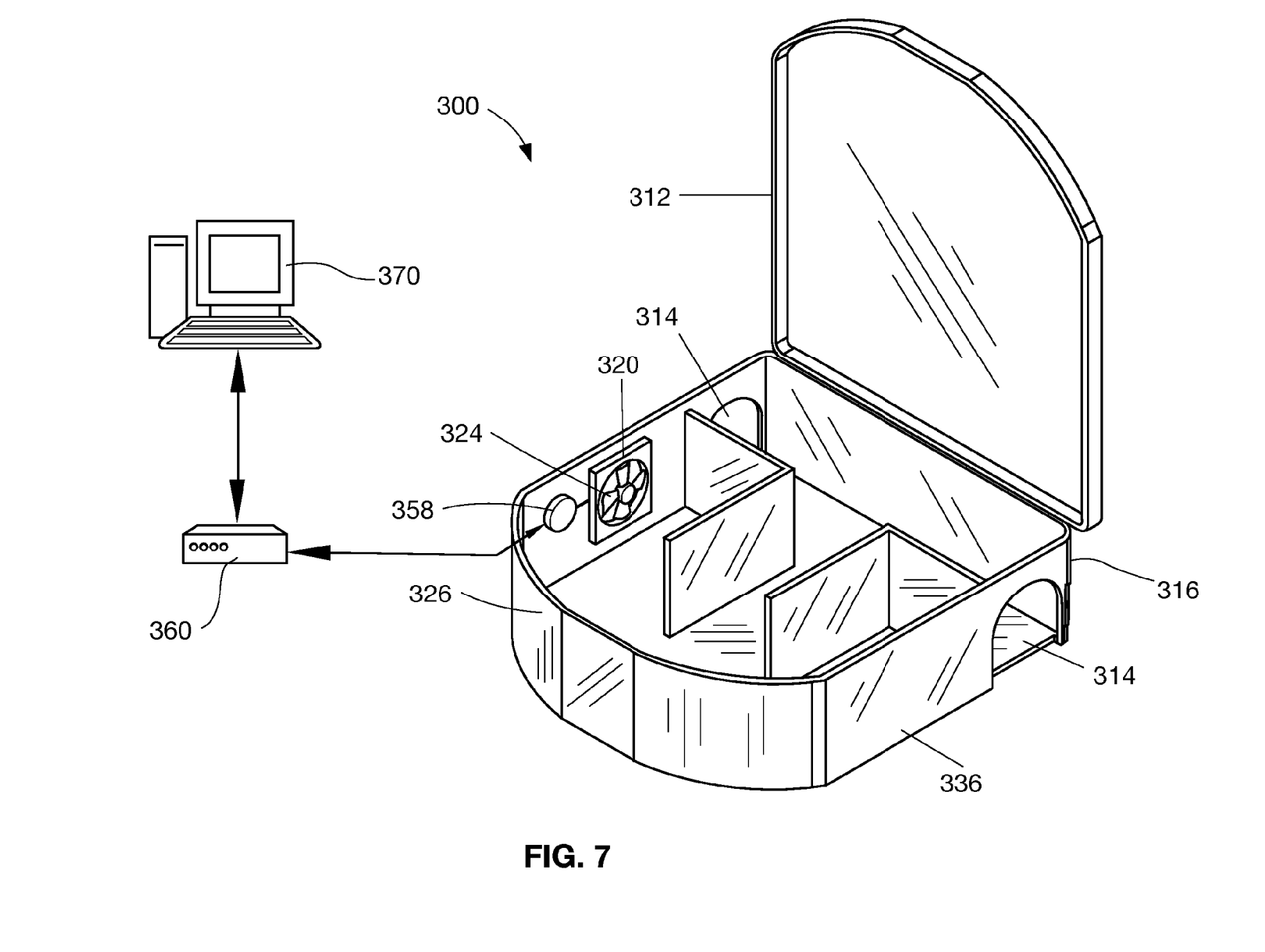
FIG. 7 is a perspective view of another embodiment of a pest control station having a side vent opening in the enclosure with a blower fan mounted in the vent opening.

FIG. 7 shows another embodiment 300 of a climate-controlled pest control station according to the invention. In this embodiment 300, at least one vent opening 320 is provided in a sidewall 326 of the base 336. A fan or blower 324 is positioned within the vent opening 320. The fan or blower 324 may be configured to draw cooler and/or drier air from outside the enclosure 316 through the vent opening 320, thereby causing displaced hot and/or humid air within the enclosure 316 to exit the enclosure 316 through other openings or gaps in the enclosure 316, such as through the access openings 314. Alternatively, the fan or blower 324 may be configured to draw hot and/or damp air from inside the enclosure 316 through the vent opening 320 and into the ambient air surrounding the enclosure 316, thereby causing cooler and drier ambient air to be drawn into the enclosure through other openings or gaps in the enclosure 316, such as through the access openings 314. In this arrangement, any heat generated by the fan is not introduced to the air within the enclosure. The fan or blower 324 may be battery or solar powered, for example, to maximize the portability of the pest control station 300. The fan or blower 324 may include a thermostat 358 to limit operation of the fan or blower 324 to periods of excessive heat within the enclosure 316. The thermostat 358 also may be configured to transmit climate measurements to a modem 360 and a remote computer 370 or the like. In addition, the computer 370 may be used to remotely set the thermostat 358 to a desired control temperature and/or to set times of operation.

Figure 8:
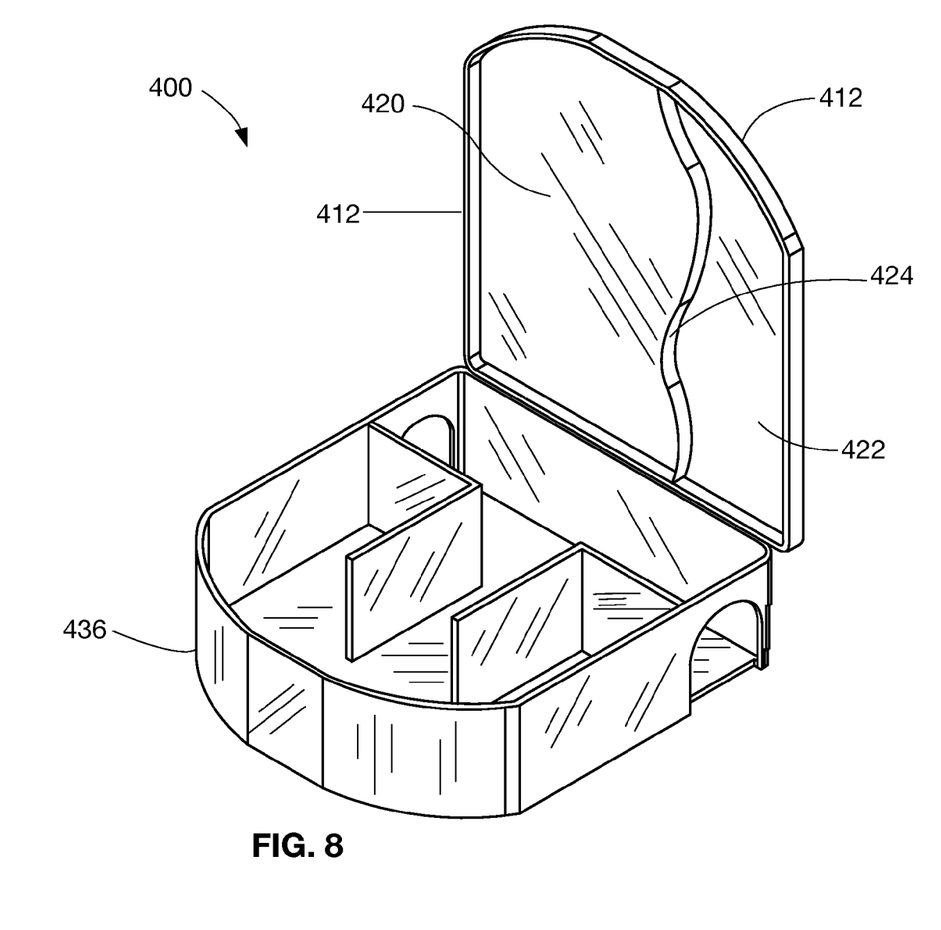
FIG. 8 is a perspective view of another embodiment of a pest control station having an insulating layer in its top cover with a portion of the insulating layer broken away.

A pest control station 400 according to the invention may also include a cover 412 having an insulating layer 420 as shown in FIG. 8. In this embodiment 400, a layer of thermal insulating material 420 such as insulating foam is positioned adjacent to an undersurface 422 of the cover 412. The insulating layer should have a thermal resistance of at least about 0.50 hr·ft$^2$·° F./Btu as measured with a heat flow meter per ASTM C518 at a mean temperature of about 75° F. For example, the insulating layer may be constructed of a sheet of polystyrene foam having a thickness of greater than equal to about 0.125 inch. In addition, an air gap 424 may be provided between the insulating layer 420 and cover surface 422 to provide a further thermal barrier between the cover 412 and air within the enclosure 416. The insulating layer 420 minimizes the amount of heat transfer from the cover 412 to air within the pest control station 400, thereby effectively moderating the temperature within the pest control station 400.

Various embodiments of the invention have been separately described above to illustrate various features and aspects of the invention. Persons of ordinary skill in the art will recognize that the various climate control features described above are not exclusive of each other, and may be combined together in various ways. For example, the invention includes a climate-controlled pest control station having a cover with a reflective surface, a heat shield, a cover having an insulating layer, a leak-resistant air vent, and a forced-air vent. Alternatively, a pest control station according to the invention may lack one or more of the described climate control features. These and other such modifications to the described embodiments are intended to be within the scope of the appended claims.

What is claimed is:

1. A climate-controlled rodent control station comprising:
   (a) an enclosure constructed of a molded polymeric material defining an interior space capable of receiving a rodent control composition or rodent control device therein, the enclosure including at least one exterior surface; and
   (b) an infrared reflector substantially shielding the at least one exterior surface;
   (c) wherein the reflector is capable of reflecting more than about 30 percent of impinging infrared solar radiation.

2. A control device according to claim 1 wherein the thermal shield has an outer shape that simulates the appearance of another object.

3. A control device according to claim 2 wherein the thermal shield has an outer shape that simulates the appearance of a rock.

4. A climate-controlled control station according to claim 1 wherein the reflector is on the exterior surface of the enclosure.

5. A climate-controlled control station according to claim 1 wherein the reflector and exterior surface of the enclosure define a space therebetween.

6. A climate-controlled control station according to claim 1 wherein the exterior surface is a substantially upward-facing surface.

7. A climate-controlled control station according to claim 1 wherein the reflector comprises a metallic material.

8. A climate-controlled control station according to claim 7 wherein the reflector comprises a metallized polymeric film.

9. A climate-controlled control station according to claim 1 wherein the reflector comprises a polymeric material.

10. A climate-controlled control station according to claim 1 and further comprising at least one vent opening in the enclosure.

11. A climate-controlled control station according to claim 10 and further comprising a blower for blowing air through the vent opening.

12. A climate-controlled control station according to claim 8 and further comprising a thermostat for regulating operation of the blower.

13. A climate-controlled control station according to claim 9 wherein the thermostat is configured to communicate with a remote computer.

14. A climate-controlled control station according to claim 1 wherein the enclosure comprises a top having a thermal insulating layer.

15. A climate-controlled control station according to claim 14 wherein the thermal insulating layer comprises an insulating foam.

* * * * *